United States Patent [19]

Tagawa et al.

[11] Patent Number: 4,745,282
[45] Date of Patent: May 17, 1988

[54] VENTILATED CORONA CHARGING

[75] Inventors: Kazuaki Tagawa; Izumi Tagoku, both of Tokyo; Itaru Matsuda, Yokohama, all of Japan

[73] Assignee: Ricoh Company, Ltd., Tokyo, Japan

[21] Appl. No.: 858,547

[22] Filed: Apr. 30, 1986

Related U.S. Application Data

[63] Continuation of Ser. No. 486,379, Apr. 19, 1983, abandoned.

[30] Foreign Application Priority Data

Apr. 20, 1982 [JP] Japan .................. 57-65761

[51] Int. Cl.[4] ............... G03G 15/02; H01T 19/00
[52] U.S. Cl. .................. 250/326; 250/325; 361/229; 361/230; 355/3 CH
[58] Field of Search .............. 250/324, 325, 326; 361/229, 230; 355/3 CH

[56] References Cited

U.S. PATENT DOCUMENTS

| | | | |
|---|---|---|---|
| 3,471,695 | 10/1969 | Hudson et al. | 250/325 |
| 3,862,420 | 1/1975 | Banks et al. | 250/324 |
| 3,936,184 | 2/1976 | Tanaka et al. | 250/325 |

OTHER PUBLICATIONS

Hammond et al., *Xerox Disclosure Journal*, vol. 1, No. 3, Mar. 1976, p. 61.

*Primary Examiner*—Craig E. Church
*Assistant Examiner*—Jack I. Berman
*Attorney, Agent, or Firm*—Oblon, Fisher, Spivak, McClelland & Maier

[57] ABSTRACT

A ventilated corona charging device for charging a charge receptor includes at least one corona wire to which a high voltage is applied, an electrically conductive shield which partly encloses the corona wire and a blower for directing a stream of air at least into a first region defined between the corona wire and the charge receptor, preferably also into a second region defined between the corona wire and the shield, in order to cause corona discharge which is uniform as well as stable.

18 Claims, 4 Drawing Sheets

VENTILATED CORONA CHARGING

This is a continuation application from application Ser. No. 486,379 filed Apr. 19, 1983, now abandoned.

BACKGROUND OF THE INVENTION

1. Field of the Invention

This invention generally relates to a technique for applying corona ions to a charge receptor or imaging surface, and, in particular, to a corona charging device for charging an imaging surface such as the surface of a photoreceptor with corona ions.

2. Description of the Prior Art

In an electrophotographic machine, typically as shown in FIG. 1, there is provided a corona charging device 2 opposite to the surface of a charge receptor 1 such as a photoreceptor or photoconductive layer which is supported on an electrically conductive backing 8 which is grounded. The corona charging device 2 is generally comprised of a corona wire 3 and an electrically conductive shield 7 which partly encloses the corona wire 3 and is connected to ground. A d.c. high voltage is applied to the corona wire by a high voltage supply 3a. If charge receptor 1 is comprised of a photoconductive material, the surface of the charge receptor 1 is charged uniformly by corona ions applied by the corona charging device 2 in a dark place. Then, a light image is exposed to dissipate the charge selectively to form an electrostatic latent image, which is then developed into a visual toner image. Thereafter, the toner image is transferred to a transfer medium such as transfer paper. It is also true that a reproduced image may be obtained by using a charge receptor which is comprised of a material other than a photoconductive material. For example, the charge receptor 1 may be comprised of a dielectric material.

When such a corona charger is applied to electrophotographic machines such as electrophotographic copying machines, it is important that it can charge an imaging surface uniformly across its entire surface. If irregularities in charging are present, they could cause irregularities in density in resulting images thereby producing reproduced images of poor quality. In order to charge the imaging surface uniformly as well as stably, each of the following three factors contributing to the performance of corona charging must be uniform not only in function but also in properties.

(1) Corona charger.
(2) Atmosphere ( usually air, including charge carriers ) between corona charger and charge receptor.
(3) Charge receptor.

It is to be noted particularly in electrophotographic machines that with respect to the above three factors, not only uniformity in space but also uniformity in time are required since the imaging surface is repetitively used. The charge carriers mentioned in item (2), for example, include $H^+(H_2O)_n$ in the case of positive coronas.

It has been confirmed that non-uniformity in space and/or time is created to produce irregularities in the atmosphere, which result in non-uniform charging, under each of the following conditions.

(a) Charging of a charge receptor is to be carried out in a low humidity environment having charge carriers of low concentration.
(b) A charge receptor has a large capacitance, requiring a large amount of charges to obtain a surface potential of desired level.
(c) A charge receptor moves too slowly and thus fresh air is difficult to flow into the charging region.

Various proposals have been made to cope with the problems mentioned in items (1) and (3); however, no viable proposal has yet been made with respect to item (2). Thus there has been a need to develop a new device capable of charging a charge receptor uniformly as well as stably which is not influenced by the surrounding condition or atmosphere.

SUMMARY OF THE INVENTION

In accordance with the present invention, there is provided a new technique for charging a charge receptor with corona ions uniformly as well as stably. In accordance with the principal aspect of the present invention, a flow of air is directed in a predetermined direction to supply fresh air to stabilize the corona discharging characteristics thereby allowing to obtain the uniform charge on the charge receptor. In a particular application, there is provided a corona charging device through which a flow of gas, typically air, is produced to stabilize the corona discharging characteristics so that the imaging surface may be charged uniformly thereby allowing to obtain a reproduced image of uniform density.

Therefore, it is a primary object of the present invention to provide a novel technique capable of charging a charge receptor uniformly as well as stably.

Another object of the present invention is to provide a device for uniformly charging a charge receptor such as a photosensitive member, which is particularly suited for use in electrophotographic machines.

A further object of the present invention is to provide a corona charging device whose corona wire or wires are prevented from being stained or contaminated by foreign matter such as scattered toner particles floating in the air.

A still further object of the present invention is to provide a corona charging device capable of charging an imaging surface uniformly without changes in performance even used for an extended period of time.

Other objects, advantages and novel features of the present invention will become apparent from the following detailed description of the invention when considered in conjunction with the accompanying drawings.

DESCRIPTION OF THE PREFERRED EMBODIMENTS

In accordance with the present invention, the gas, normally air, present in the charging region defined between a discharging member such as a corona wire and a charge receptor to which corona ions are to be applied from the discharging member is ventilated forcibly at least across a desired length of the discharging member, which corresponds in length to the area of the charge receptor requiring to be uniformly charged, by means of a ventilation unit thereby allowing to maintain uniformity in discharging characteristics of the discharging member. The desired length of the discharging member, in one example, indicates the length along the lengthwise direction of a corona wire and it corresponds to the width of an imaging area in which an electrostatic latent image is to be formed. And therefore the charge receptor is supposed to have the width larger than the desired length of the discharging member. As the ventilation unit, any appropriate means well known for those skilled in the art, such as fans and blowers with appropriate ducting, may be used.

Figure 1:
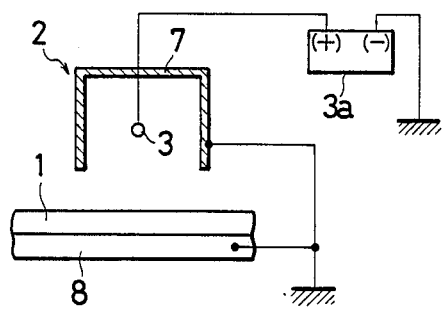
FIG. 1 is a schematic illustration showing a typical arrangement of a corona charging unit.
Figure 2:
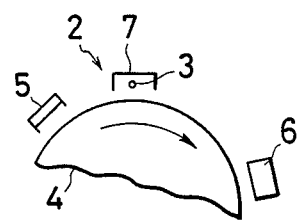
FIG. 2 is a schematic illustration showing a setup for measuring the surface potential of the imaging surface of a photosensitive drum as charged by a corona charging unit.

Referring now to FIG. 2, there is shown a setup constructed by modifying an electrophotographic copying machine in part for measuring charging condition includes a photosensitive drum 4, which is supported to be driven to rotate in a predetermined direction as indicated by the arrow at constant speed and which includes a photosensitive member provided on the periphery of the drum as a charge receptor. The corona charger 2 including the corona wire 3 and the shield 7 enclosing the wire 3 except the portion opposite to the drum 4 is disposed above the drum 4, and an appropriate high voltage is applied to the corona wire 3 with the shield 7 and the conductive backing of the photosensitive drum both connected to ground so as to apply corona ions produced around the wire 3 to the surface of the drum 4 thereby charging the photosensitive member. Also disposed upstream of the corona charger 2 with respect to the direction of rotation of the drum 4 is a discharging lamp 5 for removing the charge present on the photosensitive member by irradiation prior to charging by the corona charger 2. A detector 6 is disposed downstream of the corona charger 2 for measuring the surface potential of the photosensitive member after charging by the corona charger 2.

The setup of FIG. 2 is a well-known method for measuring the surface potential of a photosensitive member and the potential or charging condition of the photosensitive member formed on the periphery of the drum 4 may be measured across its entire surface as the drum 4 rotates. The conditions under which the measurements were taken are as follows: the diameter of the drum 4, 80 mm; photosensitive member, Se-As system; peripheral speed of the drum 4 in the direction of the arrow, 120 mm/sec.; the size in cross section of the shield or casing 7 of the corona charger 2, 20 mm×20 mm; the gap between the shield 7 and the drum 4, 2 mm; position of the corona wire 3 in the shield 7, at center; and, a high voltage supply for applying a high voltage to the corona wire 3, constant current type.

Figure 3:
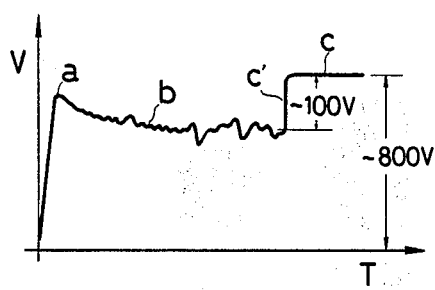
FIG. 3 is a graph showing the history of surface potential measured by the setup of FIG. 2 in which the ordinate is taken for measured surface potential V and the abscissa is taken for time T ( or distance along the periphery of the drum )

FIG. 3 shows the measured result taken under the above-described conditions. Initially, a high voltage was applied to the corona wire 3 without forced ventilation, and, thus, the surface potential immediately increased to level a upon initiation of corona discharge due to application of high voltage to the corona wire 3. The potential then slightly went down from level a with appearance of small ripples. The lowering of potential lasted for about a couple of minutes, but the appearance of ripples continued. In order to confirm this phenomenon, the detector 6 was substituted by a dry type two-component magnet brush developing device and a transfer unit was added downstream of the developing device. Under the circumstances, all black images were reproduced. If the charge on the drum 4 is uniform, the reproduced image should be all black. However, in reality, the reproduced images were found to possess a fish scale-like pattern approximately across the entire surface. Such a fish scale-like pattern is believed to be caused by the small ripples present in the discharging characteristics. Such a feature was enhanced when use was made of a half-tone image and the step of blanket exposure was added between the steps of charging and developing. It has also been confirmed that the fish scale-like pattern changes in various ways depending upon such factors as shape of the casing 7, applied voltage and peripheral speed of the drum 4.

Figure 13:
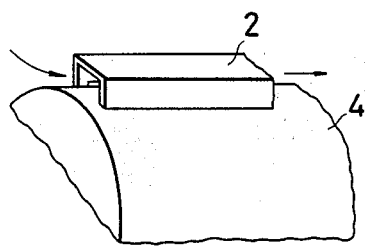

After the lowering of potential ceased and the potential was stabilized on the average at a certain level, cold wind was directed into the corona charger 2 in the direction in parallel with the rotating axis of the drum as schematically illustrated in FIG. 13. With such an air flow, a sudden rise in potential as indicated by c' in the graph of FIG. 3, approximately 100 V in this particular example, was obtained, and, thereafter, the potential was stabilized at c without ripples. Under the condition, an all black reproduced image uniform in density without irregularities was obtained. Upon termination of supply of the forced air flow, the potential went back to level b from level c with reappearance of ripples and the fish scale-like pattern was again obtained in an all black reproduced image.

Figure 4:
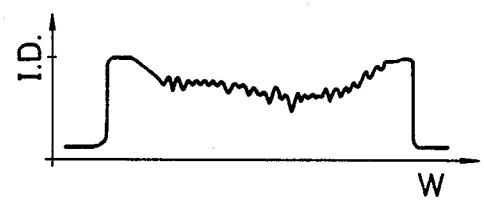
FIGS. 4–6 are qraphs each showing the characteristics between image density I.D. and distance W across the width of the drum, which were measured by the setup of FIG. 2 with or without forced ventilation.
Figure 5:
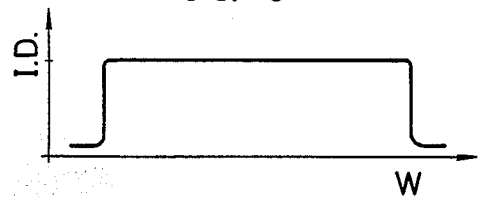

Without forced ventilation, the appearance of a fish scale-like pattern was observed not only in the circumferential direction of the drum 4 but also in the axial direction thereof. FIG. 4 shows the distribution of image density I.D. as a function of distance W along the axial direction of the drum 4. The curve shown in FIG. 4 also corresponds to the distribution of the surface potential across the width of the drum 4. As shown, the central portion of the drum 4 is relatively low in density, or potential, as compared with the opposite side portions and ripples are observable in the central portion. This corresponds to the fact that fresh air may be easily supplied to the opposite side portions but not to the central portion. The image density was found to be higher at opposite side portions, each over approximately 10 cm. FIG. 5 shows the distribution of image density across the width of the drum 4 with forced ventilation as shown in FIG. 13 and this corresponds to level c shown in FIG. 3. The effect of forced air flow is remarkable and no appreciable irregularities in density are present.

Figure 6:
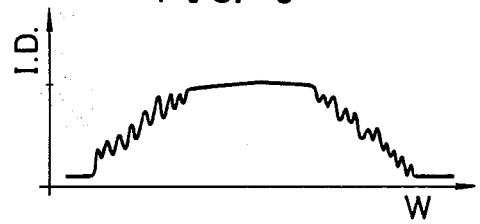

FIG. 6 shows the distribution of image density I.D. across the drum width W when potential measurements were taken with a weak air flow directed locally to the central portion of the corona wire 3 using a special pipe. With such a localized air flow, the air in want of charge carriers was pushed toward the opposite side portions along the casing 7 of the corona charger 2, and, therefore, irregularities in charging level and thus image density were observed at opoosite side portions. On the other hand, the potential level and thus image density of the central portion was found to be locally uniform and stable because of supply of fresh air. During measuring operation to obtain measurements shown in FIGS. 4–6, the total current supplied to the corona wire 3 was found to be constant consistently.

Although the stabilizing mechanism of discharging characteristics with the presence of an air flow has not yet been clarified completely, the following plausible argument may be presented. That is, charge carriers present in the air surrounding the corona wire 3 are depleted as discharge continues, thereby gradually increasing the electrical resistance of the air. The charge carriers are said to include $H^+(H_2O)_n$ which is based on $H_2$, $H_2O$, etc. With such an increased resistance, the electric field in the vicinity of the photosensitive member is weakened so that the level of charged potential becomes decreased. Moreover, since this air of increased resistance stays around the corona wire 3 in a floating condition, irregularities in resistance are produced along the length of the corona wire 3.

In accordance with the present invention, an air flow is directed from the exterior to push the floating air of high resistance toward the photosensitive member thereby supplying additional charge carriers in the region around the corona wire 3. Alternatively, $H_2$, $H_2O$ or the like may be directly supplied to the region between the corona wire 3 and the photosensitive member and its surrounding region. With such a forced flow of fresh air, the electrical resistance of the atmosphere surrounding the corona wire 3 is reduced and the electric field in the vicinity of the photosensitive member is increased. As a result, the electric field may be maintained at constant and irregularities in discharging characteristics are eliminated. Stated another way, with a forced flow of air, charge carriers, which tend to be depleted in the charging region, are continuously supplied, and thus the concentration of charge carriers in the charging region, in particular the region around the corona wire 3 and the region between the corona wire 3 and the photosensitive member, may be maintained at constant in time as well as in space. Accordingly, forced ventilation of air can eliminate irregularities in discharging characteristics and allow to charge an imaging surface uniformly. These arguments are supported by the experimental results which have been obtained by changing humidity conditions of the ventilating air and of the environment.

Figure 7:
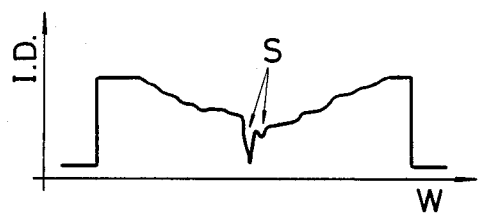
FIGS. 7 and 8 are graphs showing the characteristics between image density I.D. and distance W across the width of the drum with a stain S present in the middle of the corona wire, which were measured by the setup of FIG. 2 with or without forced ventilation.
Figure 8:
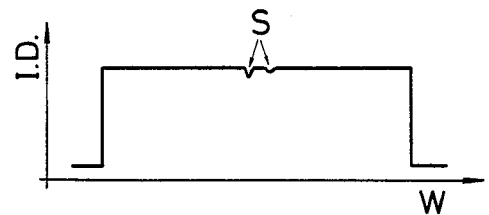

Another plausible argument as to the effect of eliminating irregularities in charging with the application of a forced air flow may be presented as in the following manner. Typically, a corona wire disposed in an electrophotgraphic copying machine becomes stained or contaminated at least locally by oil, grease, toner particles, debris or the like while it is used for some time. Such a stain is usually not created uniformly along the entire length of the corona wire 3 and thus there are produced irregularities in resistance along the corona wire 3, which then causes irregularities in discharging and charging characteristics. As a result, irregularities in image density appear across the width direction of the drum 4 as shown in FIG. 7, in which the location of stain on the corona wire 3 is indicated by "S." When a flow of air is directed to such a stained corona wire 3, it is considered that molecules such as $H_2O$ are electrostatically attracted to the stain of the wire thereby causing the electrical resistance of the stained portion to be reduced to make no differences in resistance between the stained and non-stained portions of the wire. As a result, with the application of a forced air flow, the stained corona wire 3 is made, in effect, uniform in electrical resistance along its entire length thereby allowing to prevent the occurrence of irregularities in charging and thus in image density, as shown in FIG. 8. In this manner, in accordance with the present invention, the discharging characteristics become less susceptible to stains on the corona wire 3 and thus the maintenance period for the corona wire 3 may be prolonged significantly.

Figure 9:
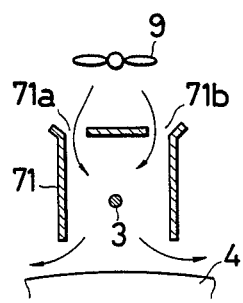
FIGS. 9-13 are schematic illustrations showing several embodiments of the ventilated corona charging device constructed in accordance with the present invention.

FIG. 9 shows one embodiment of the corona charging device provided with a ventilation structure constructed in accordance with the present invention. As shown, a pair of openings 71a and 71b for ventilation is provided in the casing or shield 71 in addition to the main opening opened toward the charge receptor 4 to be charged by corona ions emitted from the corona wire 3. These ventilation openings 71a and 71b are provided along the corners between the ceiling and the opposite side walls of the shield 71. And, thus, the forced air flow created by a fan 9 is directed into the interior of the shield 71 through these ventilation openings 71a and 71b, and this air flow then moves past the corona wire 3 to bump into the surface of the charge receptor 4 where the direction of the air flow is turned over approximately 90° so that it moves along the surface of the charge receptor 4 to be discharged to the exterior. Since the corona ions emitted from the corona wire 3 are attracted not only to the charge receptor 4 but also to the shield 71, it is advantageous to ventilate the region between the corona wire 3 and the shield 71 as well as the region between the corona wire 3 and the charge receptor 4, as in the present embodiment.

Figure 10:
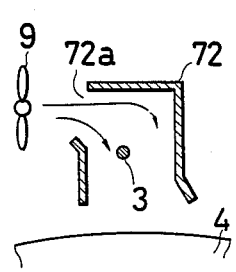
Figure 11:
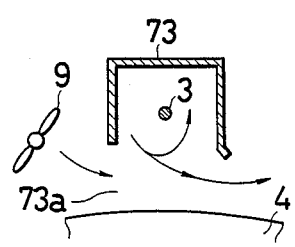

FIG. 10 shows another embodiment of the present ventilated corona charging device which includes a shield 72 provided with a ventilation opening 72a extending along one corner between the ceiling and one of the side walls of the shield or substantially in one of the side walls. The flow of air is also directed into the chamber defined by the shield 72 by the fan 9, and the air forced into the chamber passes therethrough around the corona wire 3 to be directed against the charge receptor 4. FIG. 11 shows a further embodiment of the present ventilated corona charging device, which includes a shield 73 whose one side wall has its end portion cut away to define a ventilation opening 73a between the partly cut away side wall of the shield 73 and the charge receptor 4. With this structure, the forced air flow is directed into the ventilation opening 73a as driven by the fan 9 and the air flow generally moves along the surface of the charge receptor 4 with a part swirled into the chamber defined by the shield 73. Thus the structure of FIG. 11 also allows to ventilate the region between the corona wire 3 and the shield 73 as well as the region between the corona wire 3 and the charge receptor 4.

Figure 12:
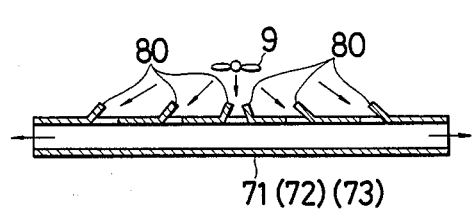

In any of the above-described embodiments of the ventilated corona charging device, it is preferable that the ventilating air is supplied uniformly along the length of the corona wire 3 or the chamber defined by the shield 71, 72 or 73. FIG. 12 shows an example which allows to attain such objective of uniform distribution of the forced air flow. That is, as shown in FIG. 12, a plurality of ventilation openings are provided as arranged in a line extending in the lengthwise direction of the shield 71 ( 72, 73 ), and an inclined guide fin 80 is provided for each of the ventilation openings such that it guides the flow of air into the chamber defined by the shield 71 through the ventilation opening. In the particular arrangement shown in FIG. 12, since the fan 9 is centrally located, a pair of air flows directed opposite in direction towards the opposite ends of the shield is created in the chamber of the shield 71. Such a structure is particularly advantageous because the chamber defined by the shield 71 may be supplied with fresh air continuously and at the same time it may be maintained free of debris and floating toner particles at all times.

Figure 14:
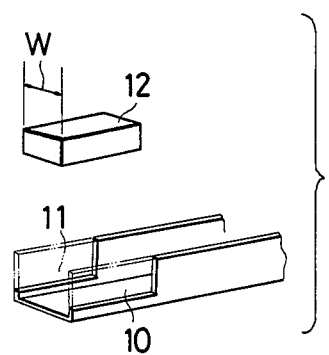
FIGS. 14 and 15 are schematic illustrations showing another embodiment of the present invention which is so structured to insure an air flow to be produced throughout the corona charging device.
Figure 15:
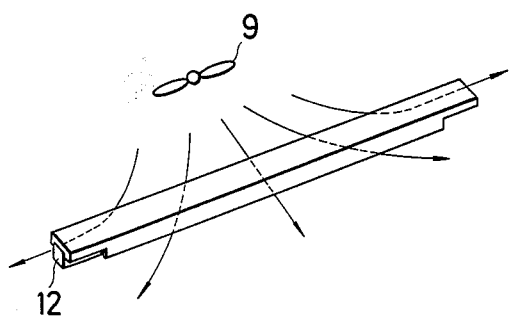

FIG. 14 shows a still further embodiment of the present ventilated corona charging device. In this embodiment, as shown in FIG. 14, end portions 10 and 11 of opposite side walls of the shield are cut away as indicated by the two-dotted lines. The length of the cut away portions 10 and 11 generally corresponds to the size of a support block 12 which is to be fixedly mounted into the shield for supporting the coron wire in position inside the chamber defined by the shield. The width W of the support block 12 is selected to be smaller than the width of the chamber defined by the shield, or the distance between the opposite side walls of the shield. This structure is preferred because the air flowing in the chamber defined by the shield may escape to the exterior through the gaps defined between the shield 71 and the support block 12 and thus it helps to create an air flow or air flows uniformly along the entire length of the chamber. A ventilating structure constructed as a combination between the embodiments shown in FIGS. 12 and 14 is shown in FIG. 15.

Figure 16:
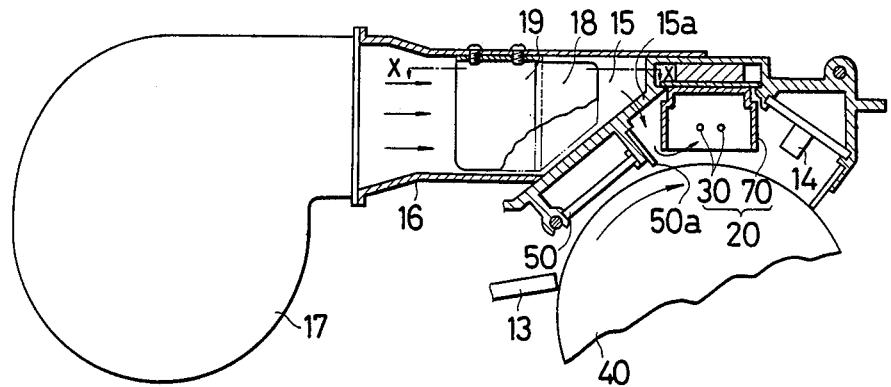
FIG. 16 is a schematic illustration showing another embodiment of the present ventilated corona charging device when applied to an electrophotographic copying machine.

FIG. 16 shows an embodiment of the present ventilated corona charging device when integrated into an electrophotographic copying machine. As shown, around the photosensitive drum 40, which is supported to be driven to rotate at constant speed in the direction indicated by the arrow, are disposed a cleaning blade 13 for removing toner particles remaining on the drum surface, a discharging lamp 50 including light emitting elements for removing the residual charge on the drum surface, a ventilated charging device 20 for charging the drum surface uniformly and an erasure lamp 14 for exposing the unwanted areas of the imaging surface in accordance with the size of an original prior to the step of image exposure in the order mentioned in compliance with the rotating direction of the drum 40. Although not shown specifically in FIG. 16, it is to be noted that other devices such as image exposure, developing and transferring devices are also provided as is obvious for those skilled in the art. In this particular embodiment, the charging unit 20 includes a pair of corona wires 30, 30 arranged in parallel and a casing or shield 70 partly enclosing the pair of corona wires 30, 30.

In the vicinity of the corona charging device 20 is defined an elongated air chamber 15 which extends generally in parallel with the corona charging device 20. Also provided is a duct 16 which is fluiddynamically connected to the air chamber 15 through an air inlet hole 18 provided at the center of the air chamber 15. The other end of the duct 16 is connected to the outlet port of a blower 17. Preferably, it is so structured that the blower 17 is driven by a common driving source which also drives other components of the copying machine because this will contribute to save mounting space inside the housing of the copying machine.

The inclined bottom wall of the air chamber 15 is provided with a plurality of slots 15a arranged in a line extending in parallel with the corona charging device 20, through which the air supplied from the blower 17 is passed. These slots 15a are provided to establish a fluiddynamic connection between the air chamber 15 and a compartment defined between a guide plate 50a fixedly mounted on the side plate for holding one end of the discharging lamp 50 and one of the opposite side walls of the shield 70 of the charging device 20. Thus, the air passing through the slots 15a is directed toward the peripheral surface of the drum 40 as guided by the guide plate 50a and the outer surface of the shield 70. The air then flows generally along the peripheral surface of the drum 40 mostly in the direction of rotation of the drum 40 and therefore the region between the corona wires 30, 30 and the drum 40 is ventilated. While the air moves through the region between the corona wires 30, 30 and the drum 40, it is partly swirled into the interior of the shield 70 and the swirling air flow moves around the corona wires 30, 30 to be again joined with the main air stream flowing along the surface of the drum 40. As a result, the interior region defined between the corona wires 30, 30 and the shield 70 is also ventilated.

Figure 17:
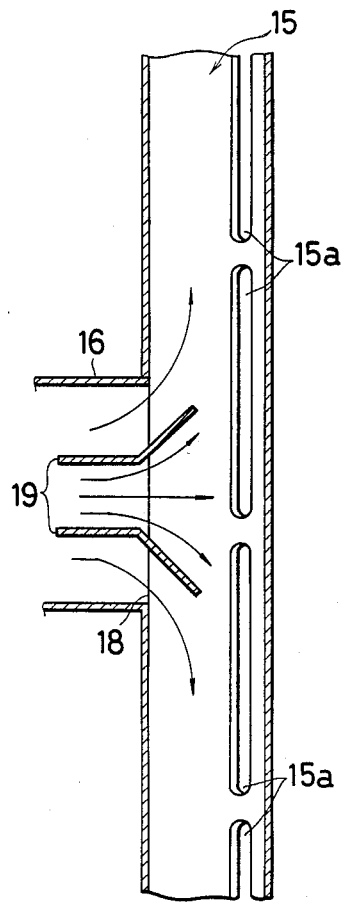
FIG. 17 is a cross sectional view on an enlarged scale taken along X—X line in FIG. 16.

As described above, the air inlet hole 18 is provided at the center of the air chamber 15 and the slots 15a are arranged in a line spaced apart from each other so that the amount of air flow passing through each of the slots 15a may differ. With this in mind, a pair of deflector plates 19, 19 is provided at the air inlet hole 18 to preferentially direct part of the air supplied from the blower 17 toward the opposite ends of the air chamber 15, as best shown in FIG. 17. With such a structure, the air flows passing through the slots 15 may be made uniform in amount. Furthermore, the area of the slot 15a may be made larger as the location of the slot 15a becomes further away from the air inlet hole 18. Such a structure additionally contributes to enhance uniformity in ventilating performance.

Figure 18:
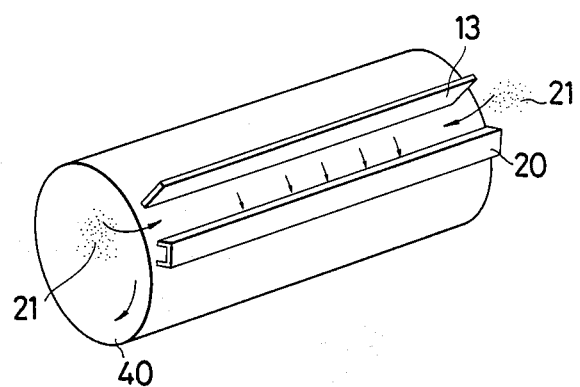
FIG. 18 is a perspective view useful for explaining how debris such as toner particles drifting in the surrounding air may be introduced into the corona charging device thereby staining its corona wire or wires.

The structure shown in FIG. 14 may be applied to the shield 70 of the corona charging device 20, and when applied, the air supplied from the fan 9 will flow in the direction indicated by the arrows in FIG. 15. In other words, the air supplied from the fan 9 will be spread over the expanse of the corona charging device 20 and the air swirled into the interior of the charging device 20 will partly escape through the gaps between the shield 70 and the support blocks 12 disposed at opposite ends of the shield 70. The advantages of the above structure will be readily appreciated when reference is made to FIG. 18. That is, as shown in FIG. 18, in the case when no provision is made of a ventilating system as described above, since the cleaning blade 13 is in scrubbing contact with the peripheral surface of the drum 40 upstream of the corona charging device 20, the space between the blade 13 and the charger 20 is at a negative pressure condition. For this reason, there will be formed a pair of air streams entering into the space between the blade 13 and the charger 20 from opposite sides. As a result, any debris or toner particles floating in the air may be sucked into the space thereby forming stains on the corona wires 30, 30. However, in accordance with the above-described embodiment of the present invention, since the forced air flow is directed into the air chamber 15 through the air inlet opening 18 provided at the center of the chamber 15, the air is forced to move not only in the circumferential direction of the drum 40 but also in the axial direction of the drum 40. Thus, the interior of the corona charging device 20 is always filled with the fresh air supplied from the blower 17, which is preferably filtered, and the corona wires 30, 30 are prevented from being stained by debris or toner particles floating in the surrounding air.

Incidentally, using the structure generally shown in FIG. 16, an all black image was reproduced under the operating conditions of peripheral speed of drum 40 at 120 mm/sec., discharging width of charger 20 at 298 mm, total discharging current approximately at 300 micro Amps., current passing through drum 40 at 82 micro Amps. and flow rate of air at 300 liters/min. and the reproduced image was found to be excellent in quality without irregularities in density.

It is to be noted that the above description only relates to a corona charging device for charging a charge receptor uniformly prior to the step of image exposure, but the present invention should not be limited only to such an application. The present invention may be equally applied to other corona units provided for other purposes such as image transfer, separation of a transfer medium from the imaging surface and discharging of the imaging surface. However, it is also true that the present invention may be most preferably applied to corona charging devices which are used for charging the imaging surface uniformly prior to the step of image exposure.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A ventilated corona charging device for charging a receptor positioned opposite to said device, comprising:
    a first electrode of a small cross-sectional size extending in parallel above a surface portion of the charge receptor for forming a concentration of electric field therethrough enough to cause corona discharge when a high voltage above the corona onset level is applied thereto;
    a second electrode partly enclosing said first electrode and including at least one ventilation opening, said second electrode being comprised of an electrically conductive material and connected to a predetermined potential; and
    means for supplying a flow of gas directed in a direction generally normal to a set of hypothetical straight lines extending between points on said first electrode and said charge receptor which are closest to one another thereby maintaining the corona discharge characteristically uniform substantially along the entire length of said first electrode and causing part of said flow of gas to pass through said ventilation opening to ventilate a region between said first and second electrodes, said means for supplying including a source for supplying said gas and an air chamber juxtaposed to said first electrode and extending generally in parallel with and over approximately the same length as said first electrode, said air chamber being provided with an inlet port at its center to receive said gas supplied from said source and also with a plurality of outlet ports arranged in a line in parallel with said first electrode thereby spreading the flow of gas the entire length of said first electrode, and said means for supplying further including deflecting means disposed at said inlet port of said air chamber for deflecting a part of said gas supplied from said source toward the opposite ends of said air chamber, thereby obtaining a substantially uniform charging characteristic against said receptor along the entire length of said first electrode.

2. A device of claim 1 wherein said first electrode includes at least one corona wire having a small diameter and extending over a predetermined length.

3. A device of claim 2 wherein said second electrode substantially encloses said at least one corona wire except that portion opposite to said charge receptor, said that portion defining a main opening through which corona ions are passed to be deposited onto said charge receptor.

4. A device of claim 1 wherein said outlet ports are in the form of slots.

5. A ventilated corona charging device for charging a charge receptor positioned opposite to said device, comprising:
    at least one corona wire extending straight over a predetermined length generally in parallel with said charge receptor;
    an elongated shield electrode having an elongated opening and an end opening at each end thereof, said shield electrode substantially enclosing said corona wire, said elongated opening being positioned opposite to said charge receptor and said shield electrode being comprised of an electrically conductive material;
    means for supplying a flow of gas in a direction generally normal to a hypothetical plane including said corona wire and a portion of said charge receptor closest to said corona wire, said gas flow supplying means including first gas flow guiding means disposed adjacent to and extending in parallel with said elongated shield electrode, a gas source for generating said flow of gas and second flow guiding means extending from said gas source approximately to a center portion of said first gas flow guiding means thereby providing a tendency to flow toward both ends of and partly through said end openings of said shield electrode to said gas flow when discharged out of said first gas flow guiding means.

6. A device of claim 5 wherein said first gas flow guiding means includes an elongated channel disposed in parallel with said shield electrode, said channel being provided with a plurality of discharging openings spaced apart from each other in a line such that such gas flow disharging out of said plurality of discharging openings is generally directed to pass between said shield electrode and said charge receptor.

7. A device of claim 6 wherein said second gas flow guiding means includes a duct which extends from said gas source to an inlet opening provided at the center of said elongated channel so that the gas supplied from said gas source to said elongated channel through said duct tends to flow toward the ends of said channel.

8. A device of claim 6 wherein said supplying means further includes a plurality of deflector plates provided at the junction between said duct and said elongated channel, said plurality of deflector plates deflecting said gas flow to be directed to the ends of said elongated channel when flowing into said elongated channel from said duct.

9. A device of claim 7 wherein said elongated channel is partly defined by a support plate for supporting an erasure lamp which removes any residual charge remaining on said charge receptor prior to charging by said device thereby allowing to keep said support plate from increasing in temperature.

10. A device of claim 5 further comprising cleaning means for cleaning said charge receptor to remove any foreign material deposited thereon prior to charging by said device.

11. A device of claim 10 wherein said cleaning means includes a blade disposed to be in scrubbing contact with said charge receptor.

12. A device as in claim 5 further comprising:
a pair of support blocks which are mounted to corresponding ends of said shield electrode for support thereof in position, wherein each of said pair of support blocks is sized smaller than said shield electrode thereby defining said end openings.

13. A device as in claim 5 wherein said shield electrode is partly cut away at each end portion thereof, defining said pair of end openings.

14. A device as in claim 13, wherein:
said second electrode is generally in the shape of a trough including a top wall and a pair of opposite side walls, depending from opposite side edges of said top wall and extending generally in parallel with said first electrode, and said ventilation opening is defined by removing part of one of said pair of side walls.

15. A device as in claim 13, wherein said removed part to define said ventilation opening is an edge portion of said one of said pair of side walls.

16. A ventilated corona charging device for charging a charge receptor positioned opposite to said device, comprising:
at least one corona wire extending straight over a predetermined length generally in parallel with said charge receptor;
a shield electrode formed generally in the shape of a trough, including a top wall and a pair of side walls depending from opposite sides of the top wall, and having an elongated opening, a plurality of ventilation openings formed in one of said pair of side walls arranged in a line and larger in size as located closer to each end of said shield electrode and an end opening at each end of said shield electrode, said shield electrode substantially enclosing said corona wire, said elongated opening being positioned opposite to said charge receptor and said shield electrode being comprised of an electrically conductive material;
means for supplying a flow of gas in a direction generally normal to a hypothetical plane including said corona wire and a portion of said charge receptor closest to said corona wire into an interior of said trough-shaped shield electrode through said plurality of ventilation openings, said flow of gas being directed approximately to a center of said trough-shaped shield electrode thereby providing a tendency to flow toward both ends of and partly through said end openings of said shield electrode to said gas flow when flowing through the interior of said shield electrode.

17. A device as in claim 16, wherein:
said shield electrode is provided with a plurality of guide fins for guiding the flow of gas from said means for supplying into the interior of said shield electrode through said plurality of ventilation openings.

18. A device as in claim 17, wherein said means for supplying includes a fan for supplying said flow of gas directed approximately to the center of said shield electrode.

* * * * *